United States Patent
Astala et al.

(10) Patent No.: US 6,943,778 B1
(45) Date of Patent: Sep. 13, 2005

(54) TOUCH SCREEN INPUT TECHNIQUE

(75) Inventors: Arto Astala, Vantaa (FI); Tapio Mansikkaniemi, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/714,941

(22) Filed: Nov. 20, 2000

(51) Int. Cl.$^7$ .............................................. G09G 5/00
(52) U.S. Cl. ........................ 345/173; 345/1.1; 709/217
(58) Field of Search ................................ 345/173, 174,
345/175, 176, 177, 178, 179, 863, 864, 1.1,
345/1.2, 2.1, 2.3; 178/18.1, 18.01, 19.01; 709/217–219

(56) References Cited

U.S. PATENT DOCUMENTS

| | | | | |
|---|---|---|---|---|
| 4,899,138 | A * | 2/1990 | Araki et al. ................. | 345/173 |
| 4,914,624 | A * | 4/1990 | Dunnthorn ................... | 345/173 |
| 5,615,384 | A * | 3/1997 | Allard et al. ................ | 345/173 |
| 5,959,615 | A * | 9/1999 | Yamade et al. .............. | 345/173 |
| 6,129,449 | A * | 10/2000 | McCain et al. ............. | 345/173 |
| 6,208,329 | B1 * | 3/2001 | Ballare ........................ | 345/173 |
| 2002/0002594 | A1 * | 1/2002 | Roundtree et al. .......... | 709/217 |
| 2002/0065109 | A1 * | 5/2002 | Mansikkaniemi et al. .. | 455/566 |

* cited by examiner

*Primary Examiner*—Xiao Wu
(74) *Attorney, Agent, or Firm*—Antonelli, Terry, Stout & Kraus, LLP (57) ABSTRACT

A technique for inputting data, such as selecting a particular function of electronic device, using a touch screen of the electronic device, includes detecting when an object, such as a finger or a stylus or a pointed object, is touching the touch screen and detecting when the object is no longer touching the touch screen. The location of the object touching the touch screen is also detected. The time duration from the time of detection of the object first touching the touch screen until the time of detection of the object no longer touching the touch screen is detected. A determination of the data being inputted, such as the particular function of the electronic device being selected, is made based on the detected location of the object on the touch screen and the measured time duration. The detecting that the object is touching the touch screen may include detecting that a pressure of the object on the touch screen is greater than a predetermined value and the detecting that the object is no longer touching the catch screen may include detecting that the pressure of the object on the touch screen is less than a predetermined value. The measuring of the time duration may include determining which of a predetermined group of time duration ranges the measured time duration is within.

86 Claims, 7 Drawing Sheets

TOUCH SCREEN INPUT TECHNIQUE

CROSS-REFERENCE TO RELATED APPLICATIONS

The present application is related to U.S. application Ser. No. 09/609,581, filed in the U.S. Patent and Trademark Office on Jun. 20, 2000; U.S. application Ser. Nos. 09/607,637 and 09/607,638, both filed in the U.S. Patent and Trademark Office on Jun. 30, 2000; and U.S. application Ser. No. 09/659,416, filed in the U.S. Patent and Trademark Office on Sep. 11, 2000, the content of these applications being incorporated by reference herein in their entirety. Furthermore, priority is claimed under 35 U.S.C. §120 for the aforecited U.S. application Ser. No. 09/607,638.

BACKGROUND OF THE INVENTION

The present invention relates to electronic devices and more particularly to a touch screen input technique for allowing a user input to an electronic device having a touch screen.

Advances in technology have resulted in smaller and more sophisticated electronic devices becoming available. These devices, such as portable communication devices, allow a user wireless access to communication networks, thereby enabling both Internet access and two-way e-mail communication.

As the size of these communication devices decreases and as the number of functions increase, it has become increasingly important for a user to be able to enter commands and information into the communication device in an efficient manner. With a reduction in size of the device, a keypad input device must also be reduced in size, thereby decreasing the efficiency with which information can be input by reducing the number and size of the keys. Furthermore, with a reduction in size of the device, the display size must also be reduced. Still furthermore, the use of a mouse with such devices is usually not possible since a mouse requires a flat clean surface to be properly used.

The use of a touch screen input device that serves both as a display and as an input device for the communication device allows a larger display in that a large keypad is no longer required since many of the functions have been taken over by the use of the display screen as an input device. A user enters information and data by touching the display screen at specific points.

U.S. Pat. No. 4,700,022 to Salvador et al. is directed to a method an apparatus for determining the coordinates of a contact point on a resistive type semi-analog sensitive surface. The coordinates are of a zone of contact of a conductive object, such as a finger, on a sensitive surface consisting of an insulating support having a grate formed by two terminals between which a certain number of emitting resistant strips are connected in parallel and having detecting conductive strips placed between the resistant strips. This patent merely discloses one of many techniques for determining the location of the zone of contact on a touch sensitive screen.

U.S. Pat. No. 5,119,079 to Hube et al. is directed to a touch screen user interface with expanding touch locations for a reprographic machine. The interface allows the expansion of the area for selection on the touch screen so as to improve the accuracy of selection thereof.

U.S. Pat. No. 5,545,857 to Lee et al. is directed to a remote control device having a touch screen allowing a user input via the touch screen.

While the three above-noted patents each disclose the use of a touch screen for inputting purposes, none of these patents teach or suggest a touch screen arrangement in which both the location and the time duration of a finger or other object contacting the touch screen are detected, the detected time duration being quantized into two or more values, each value corresponding to a specific input state.

SUMMARY OF THE INVENTION

An object of the present invention is to provide a touch screen technique for an electronic device, for example, which allows such electronic device to have a reasonably large display screen in a compact configuration. The keypad of the device or substantial portions of the keypad of the device are deleted and their functions implemented by the touch screen display screen, thereby allowing more space to be utilized for the display screen.

Another object of the present invention is to provide a touch screen technique for an electronic device in which both the location and the time duration of an object, such as a finger, contacting or pressing a detection point on the touch screen, are detected. The detected time duration is quantized into two or more values, each value corresponding to a specific input state. The interpretation of the contact detection may be dependent on the application and/or program phase active in the electronic device. For example, pressing a selection point for a first predetermined time period may correspond to single clicking the left button on a mouse so as to open a tool tip or to indicate alternatives available in the application of the selection point or processing phase of the application at the selection point. On the other hand, pressing a selection point for a second predetermined period of time which is longer than the first predetermined period of time may correspond to double-clicking the left button on a mouse so as to access and activate the object of the selection point.

BRIEF DESCRIPTION OF THE DRAWINGS

The foregoing and a better and the standing of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Before beginning a detailed description of the subject invention, mention of the following is in order. When appropriate, like reference numerals and characters may be used to designate identical, corresponding, or similar components in differing drawing figures. Furthermore, in the detailed description to follow, example sizes/models/values/ranges may be given, although the present invention is not limited thereto. Still furthermore, clock signals and timing signals on ranta scale and instead, exemplary and critical time values are mentioned when appropriate. As a final note, well-known components have not been shown within the drawing figures for simplicity of illustration and discussion and so as not to obscure the present invention.

Figure 1:
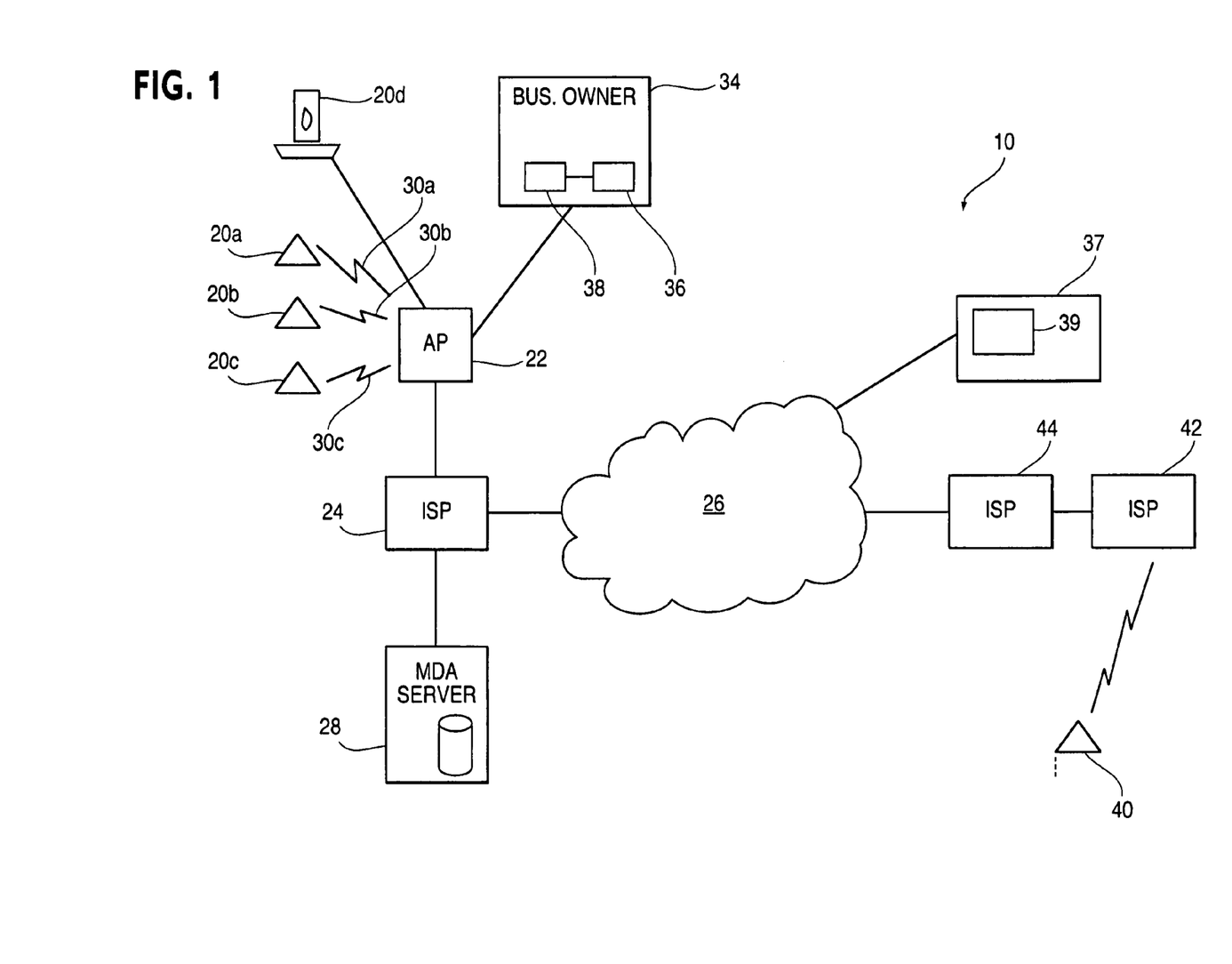
FIG. 1 is a block diagram of an example communication network having mobile terminals that are capable of communicating with a mobile display appliance (MDA) system having an MDA server with related services.

FIG. 1 is a block diagram of an example communication network having mobile terminals that are capable of communicating with a mobile display appliance (MDA) system having an MDA server with related services. Network 10 includes terminals 20a–20c, each coupled over a wireless interface to an access point 22, for communicating with the network and transmitting and retrieving information for a user. More specifically, the access point 22 is coupled to an Internet Service Provider (ISP) 24, which is coupled to the Internet 26. Accordingly, the access point 24 has an Internet address relative to the Internet address of the ISP 24. Additionally, the ISP 24 is coupled to a Mobile Display Appliance (MDA) server 28 that provides the users, through terminals 20a–20c, with specific services and features, which will be discussed herein.

Terminals 20a–20c each includes a user input and output device for allowing a user to access services of the MDA server 28. The MDA server 28 provides services, such as e-mail, calendar, notes, ability to shop on line, and necessary authentication, as well as third-party services and information.

Terminals 20a, 20b, and 20c are coupled to the access point 22 via wireless connections 30a, 30b, and 30c, respectively; hence, the user has portable or mobile access to the Internet 26 and the services provided by the MDA server 28. More specifically, terminals 20a–20c may be coupled to the access point 22 using a Wireless Local-Area-Network Gateway (WLAN GW) that is installed at a specific location, such as the user's premises or location. Although terminals 20a–20c are shown as being coupled to the MDA server 28 through the ISP 24, the present invention, as set forth in the claims, is not limited thereby. Furthermore, in the illustrated network of FIG. 1, the ISP 24 is not acting as the MDA server 28 and vice versa, even though this is possible. For example, terminals 20a–20c may be coupled directly to the MDA server 28 through the access point 22.

Additionally, even though the access point 22 is shown as being coupled to the ISP 24 through a landline 32, the present invention as set forth in the claims is not limited thereby. For example, the access point 22 can be wirelessly coupled to the ISP 24. Thus, the terminal 20 accesses the ISP 24 through the access point 22, and thus the user can access, navigate through, and retrieve information from the Internet 26 using the terminal 20.

In order for a terminal, such as terminals 20a–20c, to have access to the services of the MDA server 28, the MDA server 28 must authenticate and authorize each terminal's access. Although only the authentication and authorization steps relating to each terminal 20a–20c are discussed in detail, the teachings set forth herein are also applicable to other terminals. Upon proper authentication of each terminal 20a–20c, the user can access the services of the MDA server 28 at the authorized level of authentication.

There are two levels of authentication that provide access to the services and information of the MDA server: the family level and the private level. The family level is a level of authentication that occurs based on the identity of each of the terminals 20a–20c in order to initiate a family session. In order to create a family, at least one terminal is needed, but typically there are several terminals that make up a family, and each terminal has a unique identity that allows the terminal access to a family session at the family level. Thus, for example, anyone having access to terminal 20a could have access to the family level information. The family level authentication may be based on the identity of the hardware of the terminal 20a, and the authentication may automatically occur when the unit is powered on. Even though the authentication at the family level may automatically occur, the present invention, as set forth in the claims, is not limited thereby. For example, the terminal 20a could request input from the user 9 in order to initiate the family level authentication process. Once the terminal 20a is authorized to access the services, then each user is able to access information and services that are available to all other users in the family as well as to initiate a private session to access private information and services available only to that user.

Unlike the family session at the family level, the level of authentication for a private session at the private level requires input from the user to allow the user of a terminal, such as, for example, terminal 20a, access to information intended only for that user. For example, the user could use any terminal that is within the user's family and then initiate a private session to access information and services specific to that user. The authentication can be done using anything that is unique and only known by that user, such as a password. Thus, the user can have a private session with a secured level of privacy of information and/or services unique to that user, regardless of which terminal is being used. However, as indicated above, anyone having access to the terminal 20a would have access to the family level information and services, because it is assumed for exemplary purposes that authentication is based on the hardware of the terminal 20a and occurs automatically, and a family session is always active when the terminal is on. This allows anyone, even an unauthorized user, to access the family level services and to perform tasks, and access the Internet through the ISP 24 coupled to the access point 22.

In addition to the ISP 24, the access point 22 is also coupled to a business owner 34. The business owner 34 includes a global address server 36 and a global upgrade server 38. The Internet address of the global address server 36 may be permanently contained in the memory of the terminal 20. The global address server 36 is a place form which all the terminals, such as terminals 20a, 20b, and 20c, can fetch the Internet address of their respective MDA server. The advantage of having each terminal 20a–20c store the Internet address of the global address server 36 is that if terminals 20a–20c were relocated near another access point, then terminals 20a–20c can still obtain the Internet address location of the MDA server 28 simply by knowing the Internet address of the global address server 36. However, the invention as set forth in the claims is not limited thereby. For example, the Internet address of the MDA server 28 could be stored on terminals 20a–20c, and the memory of terminals 20a–20c could be updated as needed.

An advantage to storing the Internet address of the global address server 36 on each terminal 20a–20c is that the association between terminal and MDA server as well as changes in the Internet address of MDA servers can be easily and efficiently appreciated without having to update the memory of each terminal. The global update server 38 updates the global address sever 36 each time there is a change in the association between terminal and MDA server, when there are new terminals to associate with an MDA server, or if the Internet address of a particular MDA server is changed.

With the Internet address of the global address server 36 stored in the memory of the terminal 20, the terminal 20 is able to request and retrieve the Internet address of the MDA server 28 from the global address sever 36. The global address server 36 stores information about the location of the MDA server 28 and all other MDA servers in the network and the corresponding relation between each terminal and its MDA server, Thus, the terminal 20 is always able to obtain the address of the MDA server 28, which is the MDA server designed to serve the terminal 20. For example, the terminal 40 coupled through an access point 42 to an ISP 44 can retrieve the Internet address of the MDA server 28 from the global address server 36, provided that the MDA server 28 is the MDA server designated to serve the terminal 40 and that the terminal 40 is authenticated by the MDA server 28 as an authorized user of the services.

The user profile and terminal-specific user interface configuration settings, as well as software component or program updates to the server 28, are controlled and effected by a configuration tool manager 39 (as shown in FIG. 1) of management server 37. Possible configuration changes may affect both server 28 and/94 terminals 20a–c, and 40.

Figure 2:
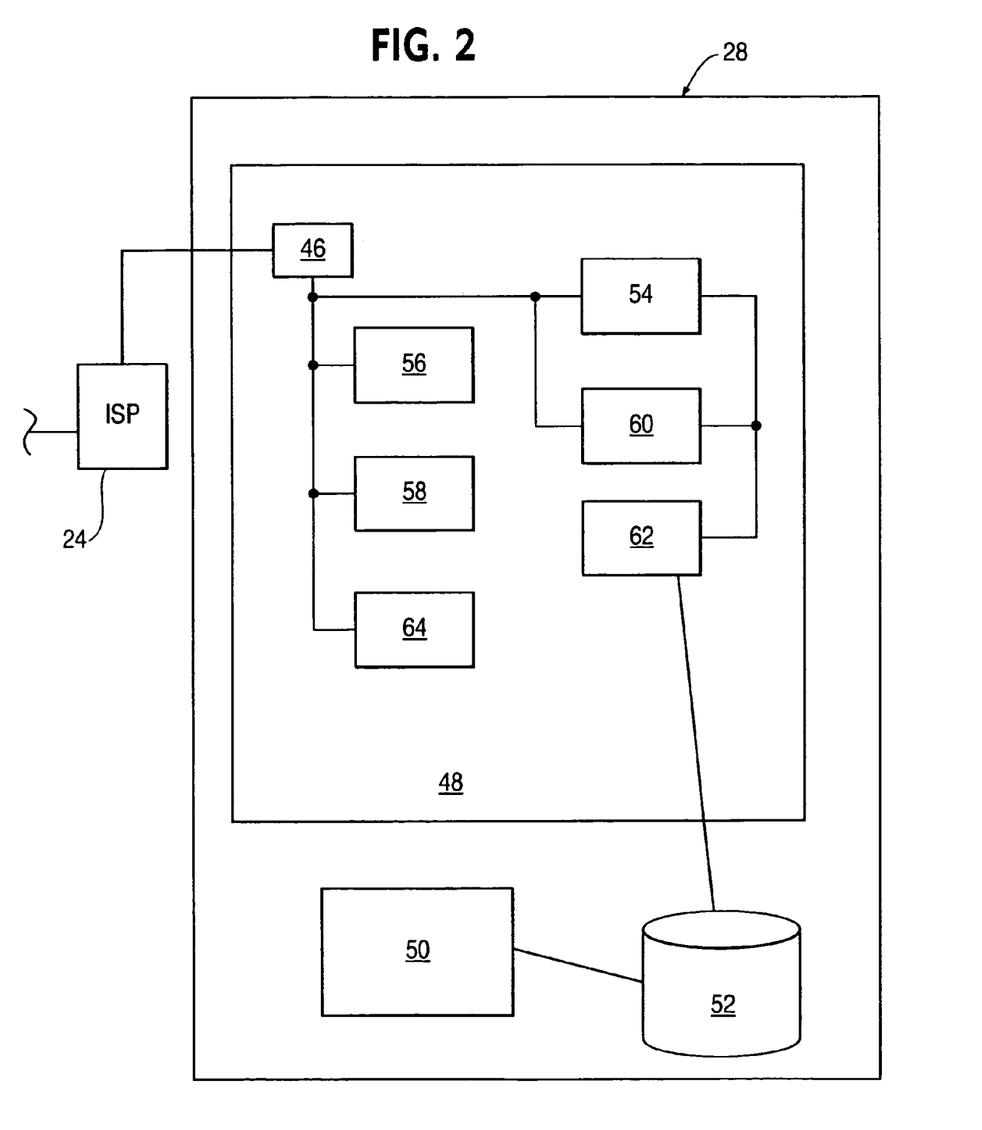
FIG. 2 is a block diagram of the MDA server of the MDA system of the network of FIG. 1.

FIG. 2 is a block diagram of the MDA server of the MDA system of the network of FIG. 1. The MDA server 38 may include an application server 46, a support server 48, a network application server 50, and a directory server 52. It will be apparent to those skilled in the art that the referenced connections do not depict the physical connections between the logical elements; the emphasis is merely on the logical connections. The support server 48 provides services oriented toward enabling and supporting the services provided to the terminal 20. The support server 48 may include an upgrade services unit 54, a login services unit 56, a profile services unit 58, an advertisement services unit 60, an administrative services unit 62, and a defined services unit 64.

The upgrade services unit 54 is a specific means for controlled software upgrade of the software for the support server 48. The login services unit 56 provides the means for authentication of the user and the terminal 20 that is being used to access the services. Additionally, the login services unit 56 is also responsible for log-off activities, such as private session termination. The profile services unit 58 provides a means for modifying a user's profile information, e.g., family and private information and preferences. The administration services unit 62 provides a means for administration of the support server 48 and the application server 46. The advertisement services unit 60 provides a means for the MDA server 28 to tailor advertisements to the user and the terminal 20 according to the user's profile information. The defined services unit 64 is a classification of other services containing items like bookmark management services, help services, log services, name management services, and general management services.

Figure 3:
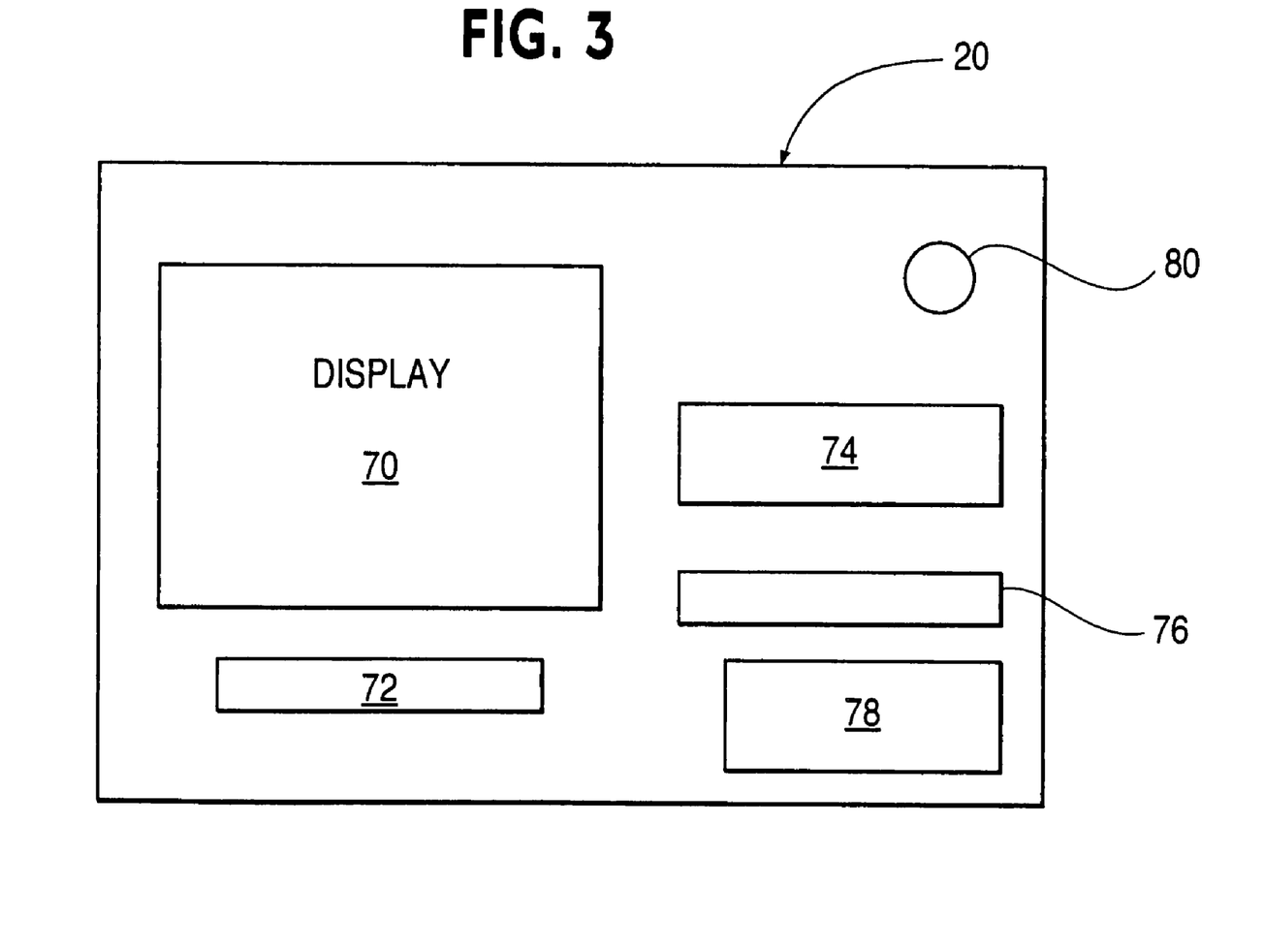
FIG. 3 is a block diagram of an example of a mobile terminal that may operate within the MDA system of FIG. 1.

FIG. 3 is a block diagram of a mobile terminal 20a that operates within the MDA system of FIG. 1. Terminals 20b and 20c may be similar in design. Terminal 20a may include a touch screen display 70, a browser 74, a driver 76, and hardware 78. The hardware 78 may include a memory for storing data, such as the Internet address of the global address server 36, and the software for operating the terminal 20, such as the browser 74. Hardware 78 may include a touch screen controller 79 for controlling the input process for touch screen 70. As the terminal 20a is turned on, the driver 76 retrieves data relating to the Internet address of the global address server 36. Once the terminal 20a is turned on, it is coupled to the access point 22 and the ISP 24. Thus, the terminal 20a is able to obtain its own Internet address. Using the Internet address of the global address server 36, the terminal 20a is coupled to the global address server 36 and sends a request in order to obtain the Internet address of the MDA server 28. Once the terminal 20a has the Internet address of its MDA server 28, it is then coupled to the MDA server 28. The MDA server 28 authenticates, using the unique identity of the hardware 78 of the terminal 20a, that the terminal 20a has family level access privileges. Accordingly, the terminal 20a is authenticated and logged onto the MDA server 28 to begin a family session at a family level. Thus, the user can now access services or retrieve information from the MDA server 28 or the Internet 26. In order for the user to initiate a private session and retrieve private information, the user must use the terminal 20a and provide further authentication to the MDA server 28 to gain access at the private level. It will be apparent to those skilled in the art that at either the family level or the private level, the user is able to retrieve information related to the family of users as well as browse the Internet 26 to retrieve information.

The browser 74 is a typical browser and may include such features as HyperText Transfer Protocol (HTTP), JAVA script, and cascade style sheet capability. As with typical Personal Computers (PCs), the browser 74 helps the user navigate through and retrieve information from the Internet once the user is connected to the ISP 24 through the terminal 20. The user utilizes the terminal 20a to connect to both the ISP 24 and the MDA server 28 using authentication protocol as discussed in detail herein. The terminal 20a is the primary means of access by the user to the MDA server 28 and the related services and applications. However, the user can also access the ISP 24 and the MDA server 28 using a PC 20d or non-mobile terminal using appropriate family level authentication initiated manually.

In order to retrieve information or to request services from the MDA server 28 or the Internet 26, the user provides the input touch screen display 70. The user can provide input using a virtual keyboard displayed on the display 70, using keyboard 72, or through the touch screen input on the touch screen display 70 utilizing various process and functions according to the embodiments of the invention. Even though the virtual keyboard may be used as the user retrieves information from the Internet 26, such as a web page, the user can receive the information at the display 70 of the terminal 20 in a full screen format. Full screen format is available because the U1 framework 72 disappears when the user types a Universal Resource Locator (URL) or follows a hyperlink while navigating the Internet 26. In order to return to the U1 framework 72, the user presses a button 80 and the virtual keyboard as well as the header and footer related to the services are presented again. Additionally, once the user presses the button 80, the web page, which was a full screen displayed prior to pressing the button 80, is reduced to a thumbnail view and positioned in the display 70, such as in the bottom left corner of the footer. Consequently, the user has a shortcut to quickly access the web page that was previously visited or to save that web page as a bookmark.

Figure 4:
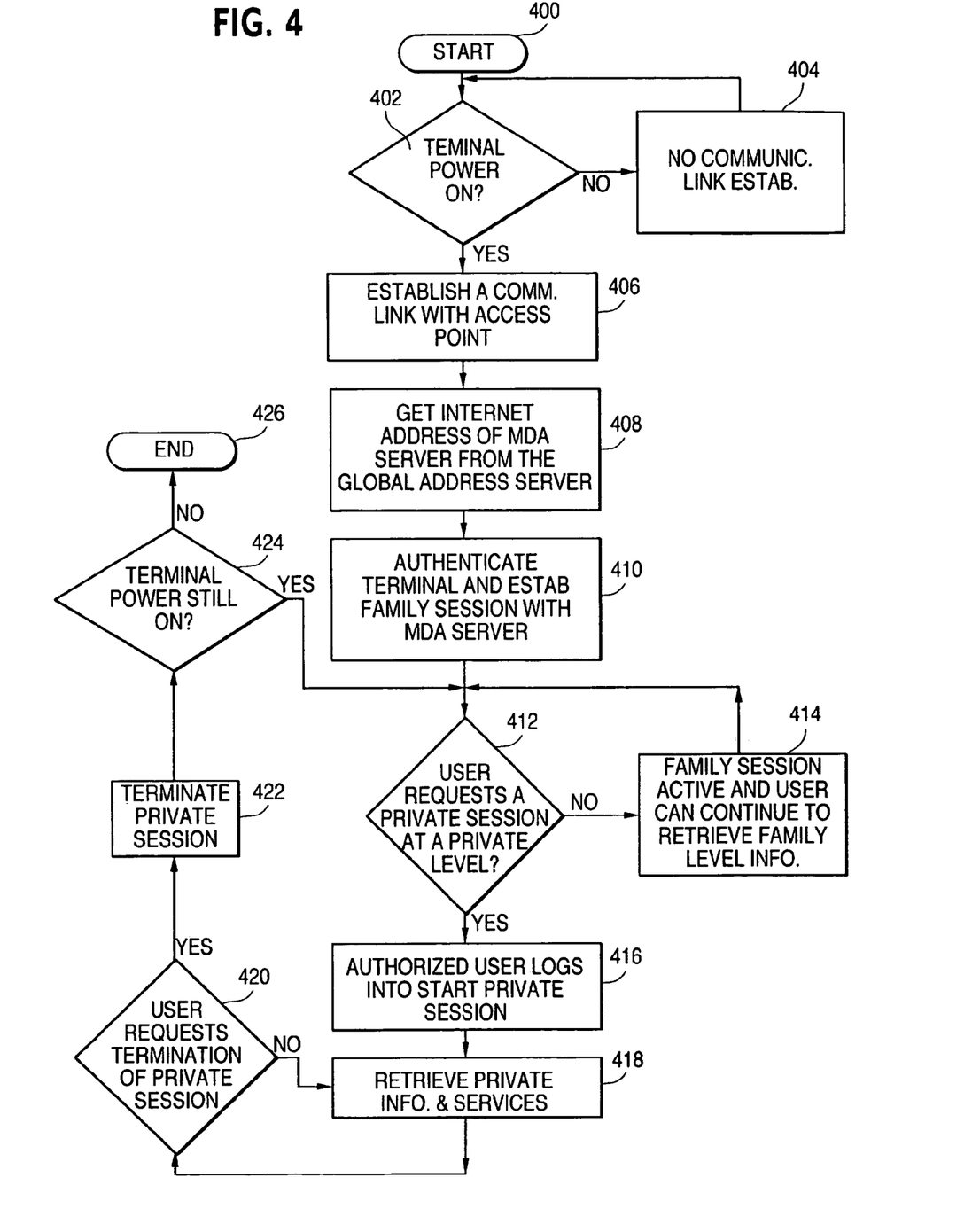
FIG. 4 is a flowchart of the process for establishing a family session and a private session between the mobile terminal of FIG. 3 and the MDA server of FIG. 1.

FIG. 4 illustrates an example of the process of authenticating a terminal at the family level to initiate a family session and authenticating the user at the private level to initiate a private session. The process of FIG. 4 begins at step 400. At step 402, it is determined whether the terminal is turned on. At step 404, if it is determined that the terminal is not turned on, then a communication link cannot be established through an access point to the MDA server; hence, the process returns to step 402 until the terminal is turned on. On the other hand, if the terminal is turned on, then the terminal establishes a connection to the access point, and hence to an ISP and a global address server. At step 408, the terminal obtains the Internet address of its MDA server from the global address server.

At step 410, the terminal communicates with the MDA server and is authenticated as an authorized terminal with access to information and services at the family level, and the family session begins and continues until the terminal is turned off. Once the MDA server recognizes the terminal, establishing the family session is an automatic background activity carried out by the terminal and transparent to the user, which is discussed with respect to FIG. 5. In order for the user to establish a private session and access private information and services, the user has to log in as a private user at the private level.

At step 412, it is determined if the user is an authorized private user. At step 414, if the user is not authenticated as a private user, then the user will only be given access to a family session with the family level information and services. On the other hand, at step 416, if the user is an authorized private user, then a private session is established and the user is allowed access to the private information and services. Although the private level information and services may be the same for all users, the content will vary from user to user.

At stop 418, in the private session the user retrieves information and uses the private level services provided by the MDA server. At step 420, it is determined if the user wants to terminate the private session and return to the family level. If it is determined that the user does not want to terminate the private session, then the user continues the private session at the private level and the process returns to step 418. On the other hand, if it is determined that the user wants to terminate the private session, then at step 422, the private session is terminated and the user goes from the private level to the family level. At step 424, it is determined if the terminal is still turned on. If the terminal is turned on, then the process returns to step 412, with the user at the family level in a family session. Otherwise, if the terminal is turned off, then the family session is also terminated, and the terminal is logged off the MDA server, and the process ends at step 426.

Thus, once the once the MDA server authenticates the terminal, then a family session begins at the family level; once the user is recognized as a private user, then a private session is initiated. Consequently, a private session remains in effect until the user explicitly terminates the private session, whereas a family session remains in effect until the terminal is turned off. Other features can be included, such as termination of the private session if no input is received from the user after a predetermined period of time.

Figure 5:
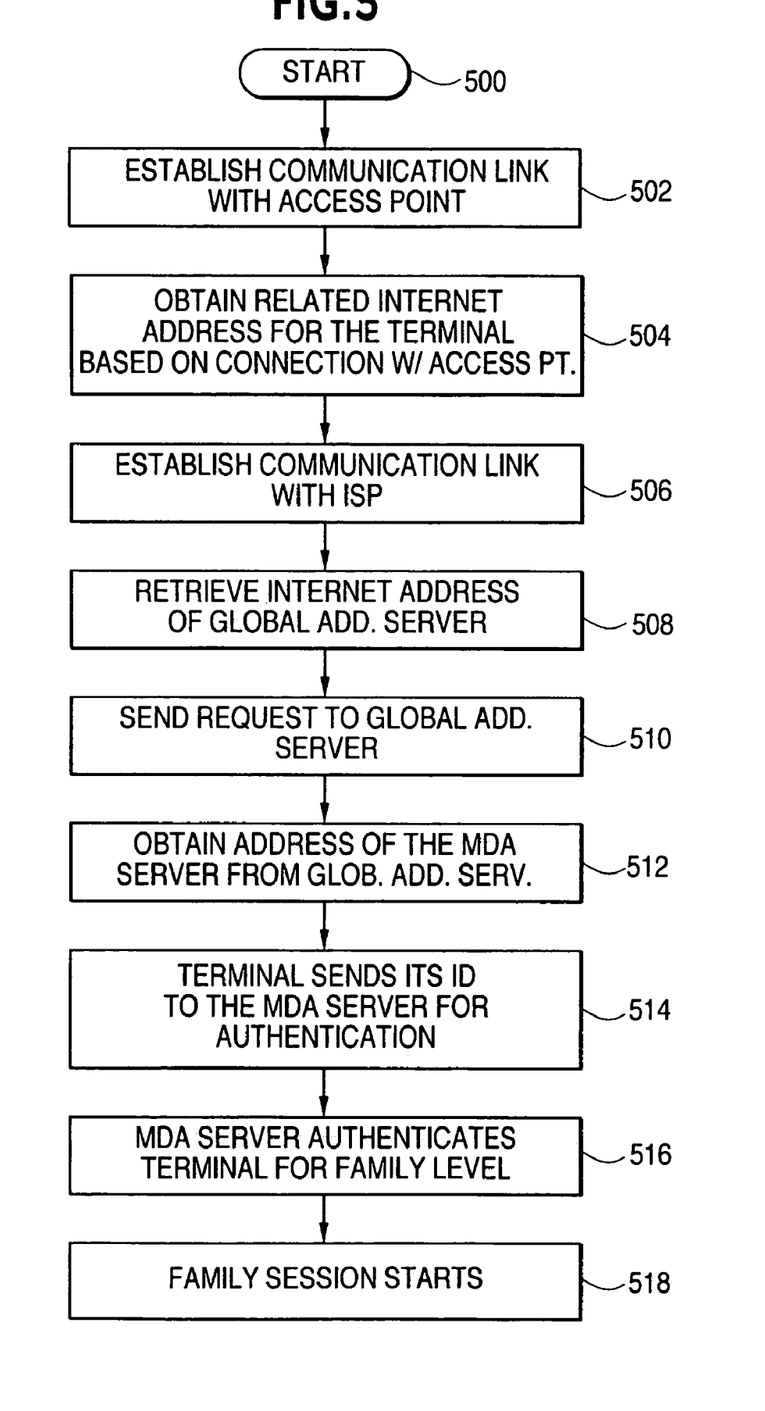
FIG. 5 is a flowchart of the process for establishing a communication link between the mobile terminal of FIG. 3 and the MDA server.

FIG. 5 illustrates an example of the process of establishing a communication link to an access point, step 406 of FIG. 4, and obtaining the Internet address of an MDA server for that terminal, step 408 of FIG. 4, for Initiating a family session at the family level begins at step 500. At stop 502, the terminal establishes a communication link with the access point. At step 504, the terminal obtains its Internet address from the access point based on the Internet address of the access point with which the terminal has established the communication link. At step 506, the terminal establishes a communication link with the ISP coupled to the access point. At step 508, the terminal retrieves the Internet address of the global address server from its memory. At step 510, the terminal sends a request to the global address server for the Internet address of the MDA server that is associated with the terminal. At step 512, the global address server returns the Internet address of the appropriate MDA server to the terminal. At step 514, the terminal sends its identification information to the MDA server located at the Internet address provided by the global address server in order to establish a communication link with the M[) A server. At step 516, the MDA server authenticates the terminal, and a family session at the family level is established between the MDA server and the terminal.

Once a family and/or private session has been established between the MDA server and terminals 20a–20c, a user may interact with the system through a virtual keyboard displayed on display 70, keyboard 72 or using the touch screen input on the touch screen 70 according to embodiments of the invention. The touch screen 70 may be one of various commercially available touch screen devices. Hardware 78 includes the touch screen controller 70 that monitors touch screen-input parameters for processing the touch inputs on the touch screen 70, which may also be one of various commercially available touch screen controllers. For the embodiment of FIGS. 6a–6d, three parameters, touch input x and y position coordinates, and a touch input z coordinate that indicates a value or magnitude of touch input pressure, or correspondingly area, that is depressed are processed by the touch screen 70 and the touch screen controller 79.

FIGS. 6a–6d illustrate an example of a process for utilizing touch screen inputs according to an embodiment of the invention. Note that the process illustrated in FIGS. 6a–6d may be used with any electronic device and is not limited to the system illustrated in FIGS. 1–5 but rather, FIGS. 1–5 and the detailed descriptions thereof have been included merely to illustrate an exemplary use of the present invention.

Figure 6A:
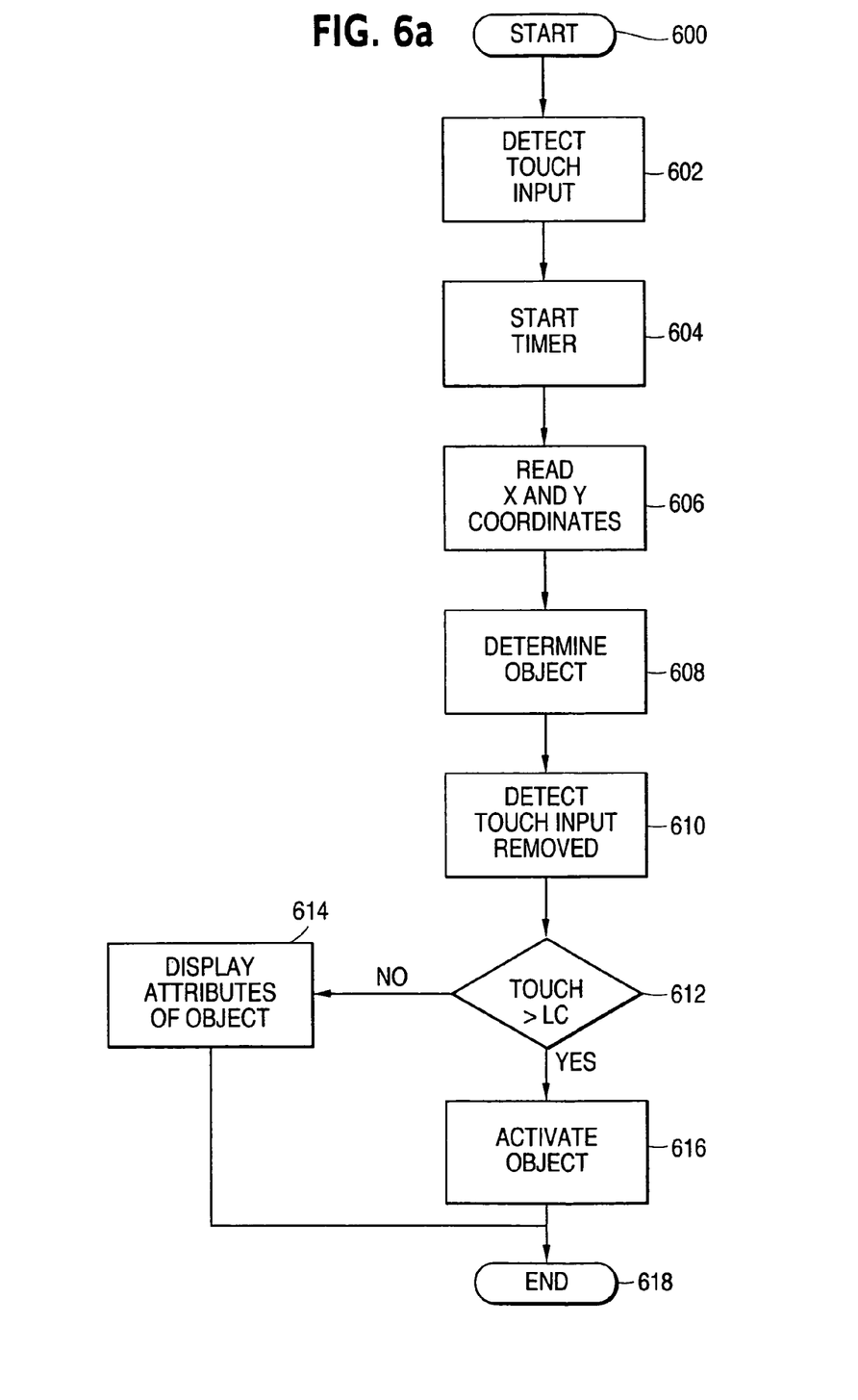
FIGS. 6a–6d are illustrations of a technique utilizing touchscreen inputs according to an embodiment of the invention.
Figure 6B:
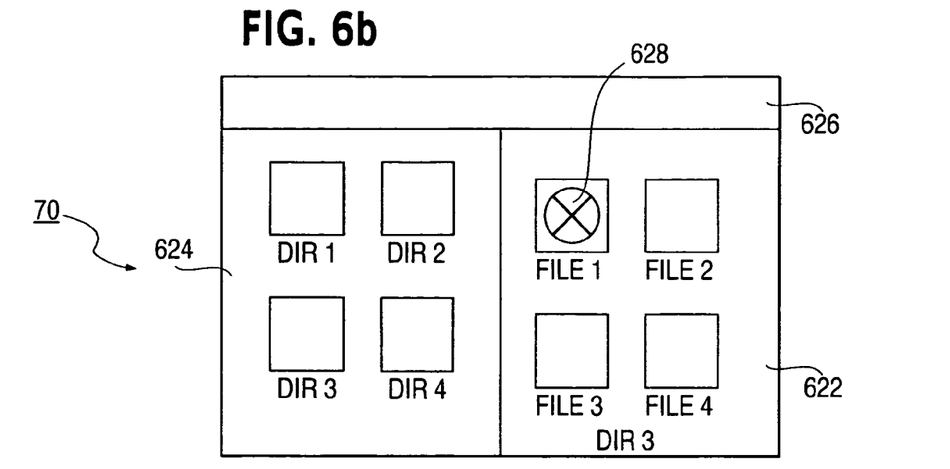
Figure 6C:
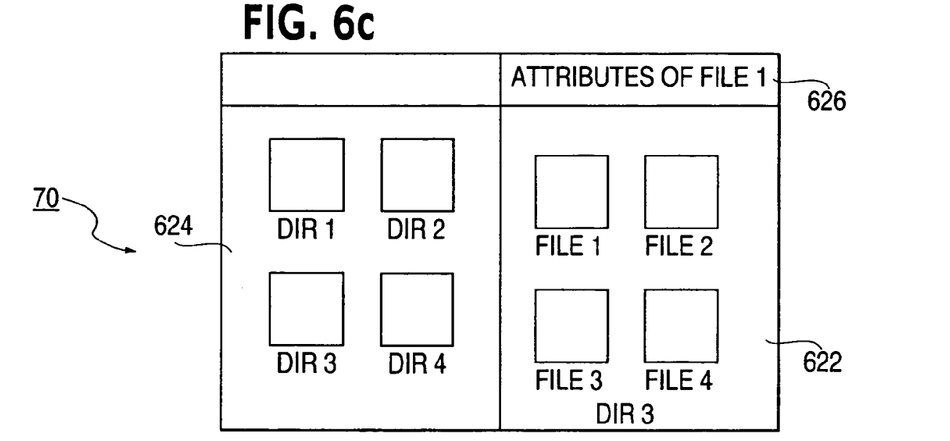
Figure 6D:
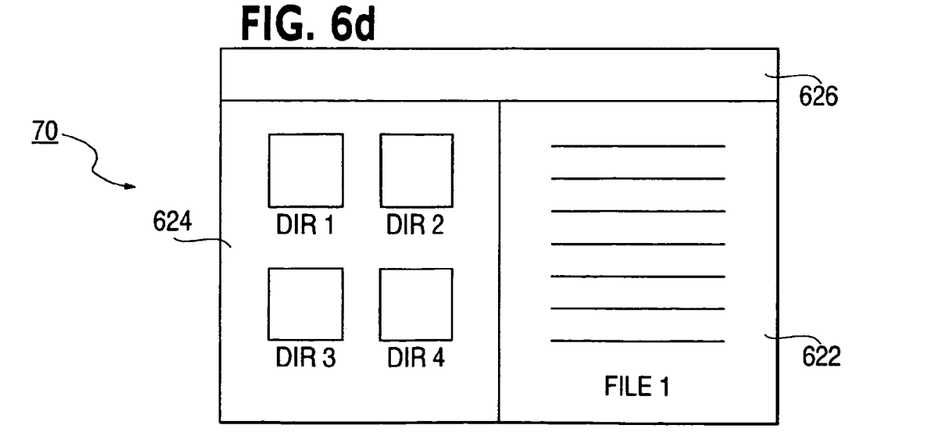

FIG. 6a illustrates process steps, and FIGS. 6b–6d illustrate the touch screen appearance during the process. In FIGS. 6b–6d, the touch screen 70 is formatted to include display windows 622, 624, and 626 for displaying various outputs of touch screen 620. Window 624 displays various user directories, and window 622 is configured to display an image for each file in directory 3. The process begins at step 600. At step 602, a touch input is detected. FIG. 6b illustrates touch input 628 over file 1 of display window 622. A touch input may be considered detected at step 602 when z is determined to be greater than a predetermined threshold value. Next, at step 604, an input timer is started. At step 606, the x and y coordinates are read, and at step 608, the object of the touch input is determined to be file 1. The process then waits for further input.

A next input occurs at step 610, when a touch input being removed from file 1 is detected. The removal of the touch input may be determined by z becoming less than a predetermined threshold value. Next, at step 612, a determination is made as to whether or not the total time of the touch input, Ttouch, was greater than a threshold value, LC, for a long click, which corresponds to a double-click of a left mouse button. If Ttouch was greater than LC, a long click has been input, and the process moves to step 616.

At step 616, the object of the touch input is activated. This is illustrated in FIG. 6*d* in the case of file 1 selected in FIG. 6*b*, where file 1 is opened and displayed in window 622. If Ttouch was less than or equal to LC, however, a short click, which corresponds to a single click of a left mouse button, has been input, and the process moves to step 614. At step 614, the attributes of the object, file 1 selected in FIG. 6*b*, are displayed. This is illustrated in FIG. 6*c*, where the attributes of file 1 are displayed in window 626.

Other embodiments of the process of FIGS. 6*a*–6*d* are possible. For example, the short click-long click function could be used on objects to signify selection of the object according to other functions. One example of this would be a short click selecting an object for a drag or move function, while a long click selects the object for opening or activation. A short or long click may also be associated with a focus screen that indicates information about a selected object or shows and/or magnifies text hidden under a touch input.

Furthermore, while in the above-noted examples, the touch screen has been touched with a finger, it is of course understood that a stylus or any other pointed object may be used with the touch screen.

One skilled in the art will realize that other variations are possible. For example, three or more different time periods of touching may be used to detect different intended input functions. More particularly, the decision box 612 of FIG. 6*a* would be replaced by a new decision box having three different decision paths, namely, a first path for the case where the detected time period is less than a first predetermined value, a second path for the case where the detected time period is equal to or greater than the first predetermined value and less than or equal to a second predetermined value, and a third path for the case where the detected time period is greater than the second predetermined value. The first and second paths could then go to respective boxes indicating the display of attributes of two different objects while the third path could then go to box 616 indicating that an object is activated.

This concludes the description of the example embodiments. Although the present invention has been described with reference to an illustrative embodiment thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings, and the appended claims without departing from the spirit of the invention. In addition to variations and modifications in the component parts and/or arrangements, alternative uses will also be apparent to those skilled in the art.

What is claimed is:

1. A method of inputting data at a wireless device using a touch screen, the method comprising:

receiving configuration information at the wireless device from a first server to configure user profile specific user interface settings and/or terminal specific user interface settings;

detecting an object touching the touch screen;

detecting the location of the object on the touch screen;

detecting x and y coordinates of a point of contact of the object on the touch screen;

detecting when the object is no longer touching the touch screen and measuring a time duration from the time of detection of the object first touching the touch screen until the time of detection of the object no longer touching the touch screen; and determining inputted data based on the detected location of the object on the touch screen and the measured time duration; and wherein:

the configuration information received from the first server affects a second server and wireless device.

2. The method of claim 1, wherein detecting that the object is touching the touch screen comprises detecting a pressure of the object on the touch screen being greater than a predetermined value.

3. The method of claim 1, wherein detecting when the object is no longer touching the touch screen comprises detecting a pressure of the object on the touch screen being less than a predetermined value.

4. The method of claim 1, wherein measuring the time duration comprises determining whether or not the time duration is greater than a predetermined value.

5. The method of claim 1, wherein measuring the time duration comprises determining whether the time duration is less than or equal to a first predetermined value or greater than the first predetermined value and less than or equal to a second predetermined value or greater than the second predetermined value.

6. The method of claim 1, wherein measuring the time duration comprises determining which of a predetermined plurality of time duration ranges the measured time duration is within.

7. The method of claim 1, wherein detecting the object touching the touch screen comprises detecting one of a finger or a stylus or a pointed object touching the touch screen.

8. The method according to claim 1, wherein the server receives the configuration information from a configuration tool manager of management server.

9. The method according to claim 1, wherein the determining inputted data corresponds to showing a hidden text under a touch input.

10. The method according to claim 1, wherein the first server is a configuration management server and the second server is a service providing server for the wireless device.

11. A wireless apparatus comprising:

a touch screen for inputting data;

a touch detector for detecting an object touching the touch screen;

a location detector for detecting the location of the object on the touch screen;

another touch detector for detecting when the object is no longer touching the touch screen and a time duration measuring unit for measuring a time duration from the time of detection of the object first touching the touch screen until the time of detection of the object no longer touching the touch screen; and a data determination unit for determining inputted data based on the detected location of the object on the touch screen and the measured time duration, and wherein the wireless apparatus receives configuration information from a server to configure user profile specific user interface settings and/or terminal specific user interface settings and the apparatus is authenticated by a server at a family level of authentication for a family session.

12. The apparatus of claim 11, wherein the location detector detects the location of the object on the touch screen by detecting x and y coordinates of a point of contact of the object on the touch screen.

13. The apparatus of claim 12, wherein the x and y coordinates correspond to a particular file location.

14. The apparatus of claim 11, wherein the touch detector detects that the object is touching the touch screen by detecting a pressure of the object on the touch screen being greater than a predetermined value.

15. The apparatus of claim 11, wherein the another detector detects when the object is no longer touching the touch screen by detecting a pressure of the object on the touch screen being less than a predetermined value.

16. The apparatus of claim 11, wherein the measuring unit measures the time duration by determining whether or not the time duration is greater than a predetermined value.

17. The apparatus of claim 11, wherein the measuring unit measures the time duration by determining whether the time duration is less than or equal to a first predetermined value or greater than the first predetermined value and less than or equal to a second predetermined value or greater than the second predetermined value.

18. The apparatus of claim 11, wherein the measuring unit measures the time duration by determining which of a predetermined plurality of time duration ranges the measured time duration is within.

19. The apparatus of claim 11, wherein the object comprises one of a finger or a stylus or a pointed object.

20. The device of claim 11, wherein the server receives the configuration information from a configuration tool manager of a management server.

21. The apparatus according to claim 11, wherein the apparatus is authenticated at a private level of authentication to initiate a private session.

22. The apparatus according to claim 21, wherein the private session allows a user of the wireless apparatus access to specific information and services unique to the user.

23. The apparatus according to claim 22, wherein the user may access the specific information and services unique to the user from any wireless apparatus.

24. The apparatus according to claim 11, wherein the private level authentication is initiated upon request from a user of the wireless apparatus.

25. The apparatus according to claim 11, wherein the family level authentication is based on an identity of hardware of the wireless apparatus, the authentication occurring one of automatically when the wireless apparatus is powered on or upon request from the wireless apparatus.

26. The apparatus according to claim 11, wherein the wireless apparatus can access all information and services that are available to all other wireless apparatus in the family session.

27. A method of selecting a particular function on a wireless electronic device having a touch screen, the method comprising:
  receiving configuration information at the wireless electronic device from a first server to configure user profile specific user interface settings and/or terminal specific user interface settings;
  detecting an object touching the touch screen;
  detecting the location of the object on the touch screen;
  detecting when the object is no longer touching the touch screen and measuring a time duration from the time of detection of the object first touching the touch screen until the time of detection of the object no longer touching the touch screen; and
  determining the particular function of the electronic device based on the detected location of the object on the touch screen and the measured time duration; and wherein
  the configuration information received from the first server affects a second server and wireless device.

28. The method of claim 27, wherein detecting the location of the object on the touch screen comprises detecting x and y coordinates of a point of contact of the object on the touch screen.

29. The method of claim 28, wherein the x and y coordinates correspond to a particular file location.

30. The method of claim 27, wherein detecting that the object is touching the touch screen comprises detecting a pressure of the object on the touch screen being greater than a predetermined value.

31. The method of claim 27, wherein detecting when the object is no longer touching the touch screen comprises detecting a pressure of the object on the touch screen being less than a predetermined value.

32. The method of claim 27, wherein measuring the time duration comprises determining whether or not the time duration is greater than a predetermined value.

33. The method of claim 27, wherein measuring the time duration comprises determining whether the time duration is less than or equal to a first predetermined value or greater than the first predetermined value and less than or equal to a second predetermined value or greater than the second predetermined value.

34. The method of claim 27, wherein measuring the time duration comprises determining which of a predetermined plurality of time duration ranges the measured time duration is within.

35. The method of claim 27, wherein detecting the object touching the touch screen comprises detecting one of a finger or a stylus or a pointed object touching the touch screen.

36. The method according to claim 27, wherein the server receives the configuration information from a configuration tool manager of management server.

37. The method according to claim 27, wherein the first server is a configuration management server and the second server is a service providing server for the wireless device.

38. A wireless electronic device having an apparatus for selecting a particular function of the electronic device using a touch screen, the electronic device comprising:
  wireless connection interface for receiving configuration information from a first server to configure user profile specific user interface settings and/or terminal specific user interface settings;
  a touch detector for detecting an object touching the touch screen;
  a location detector for detecting the location of the object on the touch screen;
  another touch detector for detecting when the object is no longer touching the touch screen and a time duration measuring unit for measuring a time duration from the time of detection of the object first touching the touch screen until the time of detection of the object no longer touching the touch screen;
  a data determination unit for determining the particular selected function based on the detected location of the object on the touch screen and the measured time duration; and wherein
  the configuration information received from the first server affects a second server and wireless device.

39. The apparatus of claim 38, wherein the location detector detects the location of the object on the touch screen by detecting x and y coordinates of a point of contact of the object on the touch screen.

40. The apparatus of claim 39, wherein the x and y coordinates correspond to a particular file location.

41. The apparatus of claim 38, wherein the touch detector detects that the object is touching the touch screen by detecting a pressure of the object on the touch screen being greater than a predetermined value.

42. The apparatus of claim 38, wherein the another detector detects when the object is no longer touching the touch screen by detecting a pressure of the object on the touch screen being less than a predetermined value.

43. The apparatus of claim 38, wherein the measuring unit measures the time duration by determining whether or not the time duration is greater than a predetermined value.

44. The apparatus of claim 38, wherein the measuring unit measures the time duration by determining whether the time duration is less than or equal to a first predetermined value or greater than the first predetermined value and less than or equal to a second predetermined value or greater than the second predetermined value.

45. The apparatus of claim 38, wherein the measuring unit measures the time duration by determining which of a predetermined plurality of time duration ranges the measured time duration is within.

46. The apparatus of claim 38, wherein the object comprises one of a finger or a stylus or a pointed object.

47. The apparatus according to claim 38, wherein the server receives terminal configuration information from a configuration tool manager of management server.

48. The method according to claim 38, wherein the first server is a configuration management server and the second server is a service providing server for the wireless device.

49. A system including at least one wireless device using a touch screen, the system comprising:
    at least one wireless device, each said wireless device operatively connected to a network;
    a mobile display appliance (MDA) server, the MDA server operatively connected to the network and providing services to the at least one wireless device;
    a business site, the business site operatively connected to the network and including a global address server and a global upgrade server, the global address server providing a network address to each at least one wireless device of their respective MDA server; and
    a management server, the management server operatively connected to the network and including a configuration tool manager that controls at least one of user profile specific user interface configuration settings, terminal specific user interface configuration settings, software component upgrades and program upgrades,
    wherein each at least one wireless device including stored instructions, the instructions when executed causing the wireless device to perform:
        receiving configuration information at the wireless device from the management server to configure user profile specific user interface settings and/or terminal specific user interface settings;
        detecting an object touching the touch screen;
        detecting the location of the object on the touch screen;
        detecting x and y coordinates of a point of contact of the object on the touch screen;
        detecting when the object is no longer touching the touch screen and measuring a time duration from the time of detection of the object first touching the touch screen until the time of detection of the object no longer touching the touch screen; and
        determining inputted data based on the detected location of the object on the touch screen and the measured time duration; and wherein
    the device is authenticated by the MDA server and at a family level of authentication for a family session.

50. The system according to claim 49, wherein the MDA server provides services to the at least one wireless device related to email, calendar, notes, ability to shop online, authentication and third party services and information.

51. The system according to claim 49, wherein each said wireless device is operatively connected to the network via the service provider.

52. The system according to claim 49, wherein the network comprises the Internet.

53. The system according to claim 49, wherein each at least one wireless device stores a network address of the global address server.

54. The system according to claim 49, wherein each at least one wireless device stores a network address of the MDA server.

55. The system according to claim 49, wherein the MDA server includes an application server, a support server, a network application server and a directory server.

56. The system according to claim 55, wherein the support server includes an upgrade services unit, a login services unit, a profile services unit, an advertisement services unit, an administrative services unit, and a defined services unit.

57. The device according to claim 49, wherein the device is authenticated at a private level of authentication to initiate a private session.

58. The device according to claim 57, wherein the private session allows a user of the wireless device access to specific information and services unique to the user.

59. The device according to claim 58, wherein the user may access the specific information and services unique to the user from any wireless device.

60. The device according to claim 49, wherein the private level authentication is initiated upon request from a user of the wireless device.

61. The device according to claim 49, wherein the family level authentication is based on an identity of hardware of the wireless device, the authentication occurring one of automatically when the wireless device is powered on or upon request from the wireless device.

62. The device according to claim 49, wherein the wireless device can access all information and services that are available to all other wireless devices in the family session.

63. A system for inputting data at a wireless device using a touch screen, the system comprising:
    a server, the server operatively connected to a network; and
    at least one wireless device, each said wireless device operatively connected to the network and receiving configuration information at the wireless device from the server to configure user profile specific user interface settings and/or terminal specific user interface settings, each said wireless device comprising:
        means for detecting an object touching the touch screen;
        means for detecting the location of the object on the touch screen;
        means for detecting x and y coordinates of a point of contact of the object on the touch screen;
        means for detecting when the object is no longer touching the touch screen and measuring a time duration from the time of detection of the object first touching the touch screen until the time of detection of the object no longer touching the touch screen; and means for determining inputted data based on the detected location of the object on the touch screen and the measured time duration; and wherein the configuration information received from the server affects a second server and wireless device.

64. The system according to claim 63, wherein the server is a configuration management server and the second server is a service providing server for the wireless device.

65. A method of inputting data at a wireless device using a touch screen, the method comprising:

receiving configuration information at the wireless device from a first server to configure user profile specific user interface settings and/or terminal specific user interface settings;

detecting an object touching the touch screen;

detecting the location of the object on the touch screen;

detecting x and y coordinates of a point of contact of the object on the touch screen;

detecting when the object is no longer touching the touch screen and measuring a time duration from the time of detection of the object first touching the touch screen until the time of detection of the object no longer touching the touch screen;

determining inputted data based on the detected location of the object on the touch screen and the measured time duration; and authenticating the wireless device by the first server and at a family level of authentication for a family session.

66. The method according to claim 65, further comprising authenticating the wireless device at a private level of authentication to initiate a private session.

67. The method according to claim 66, wherein the private session allows a user of the wireless device access to specific information and services unique to the user.

68. The method according to claim 66, wherein the user may access the specific information and services unique to the user from any wireless device.

69. The method according to claim 66, wherein the private level authentication is initiated upon request from a user of the wireless device.

70. The method according to claim 65, wherein the family level authentication is based on an identity of hardware of the wireless device, the authentication occurring one of automatically when the wireless device is powered on or upon request from the wireless device.

71. The method according to claim 65, wherein the wireless device can access all information and services that are available to all other wireless devices in the family session.

72. A method of selecting a particular function on a wireless electronic device having a touch screen, the method comprising:

receiving configuration information at the wireless electronic device from a first server to configure user profile specific user interface settings and/or terminal specific user interface settings;

detecting an object touching the touch screen;

detecting the location of the object on the touch screen;

detecting when the object is no longer touching the touch screen and measuring a time duration from the time of detection of the object first touching the touch screen until the time of detection of the object no longer touching the touch screen;

determining the particular function of the electronic device based on the detected location of the object on the touch screen and the measured time duration; and authenticating the wireless device by the first server at a family level of authentication for a family session.

73. The method according to claim 72, further comprising authenticating the wireless device at a private level of authentication to initiate a private session.

74. The method according to claim 73, wherein the private session allows a user of the wireless device access to specific information and services unique to the user.

75. The method according to claim 74, wherein the user may access the specific information and services unique to the user from any wireless device.

76. The method according to claim 72, wherein the private level authentication is initiated upon request from a user of the wireless device.

77. The method according to claim 72, wherein the family level authentication is based on an identity of hardware of the wireless device, the authentication occurring one of automatically when the wireless device is powered on or upon request from the wireless device.

78. The method according to claim 72, wherein the wireless device can access all information and services that are available to all other wireless devices in the family session.

79. A wireless electronic device having an apparatus for selecting a particular function of the electronic device using a touch screen, the electronic device comprising:

wireless connection interface for receiving configuration information from a first server to configure user profile specific user interface settings and/or terminal specific user interface settings;

a touch detector for detecting an object touching the touch screen;

a location detector for detecting the location of the object on the touch screen;

another touch detector for detecting when the object is no longer touching the touch screen and a time duration measuring unit for measuring a time duration from the time of detection of the object first touching the touch screen until the time of detection of the object no longer touching the touch screen; and a data determination unit for determining the particular selected function based on the detected location of the object on the touch screen and the measured time duration; and wherein the device is authenticated by a server at a family level of authentication for a family session.

80. The device according to claim 79, wherein the device is authenticated at a private level of authentication to initiate a private session.

81. The device according to claim 80, wherein the private session allows a user of the wireless device access to specific information and services unique to the user.

82. The device according to claim 81, wherein the user may access the specific information and services unique to the user from any wireless device.

83. The device according to claim 79, wherein the private level authentication is initiated upon request from a user of the wireless device.

84. The device according to claim 79, wherein the device is authenticated at a family level of authentication for a family session.

85. The device according to claim 49, wherein the family level authentication is based on an identity of hardware of the wireless device, the authentication occurring one of automatically when the wireless device is powered on or upon request from the wireless device.

86. The device according to claim 84, wherein the wireless device can access all information and services that are available to all other wireless devices in the family session.

* * * * *